(12) United States Patent
Zhang et al.

(10) Patent No.: US 8,315,320 B2
(45) Date of Patent: Nov. 20, 2012

(54) UPLINK POWER HEADROOM REPORTING FOR CARRIER AGGREGATION

(75) Inventors: Guodong Zhang, Syosset, NY (US); Erdem Bala, Farmingdale, NY (US); Philip J. Pietraski, Huntington Station, NY (US); Sung-Hyuk Shin, Northvale, NJ (US); Kyle Jung-Lin Pan, Smithtown, NY (US); Joseph S. Levy, Merrick, NY (US); Jin Wang, Princeton, NJ (US); Peter S. Wang, East Setauket, NY (US); Janet A. Stern-Berkowitz, Little Neck, NY (US); John W. Haim, Baldwin, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 229 days.

(21) Appl. No.: 12/630,562

(22) Filed: Dec. 3, 2009

(65) Prior Publication Data

US 2010/0158147 A1 Jun. 24, 2010

Related U.S. Application Data

(60) Provisional application No. 61/119,471, filed on Dec. 3, 2008, provisional application No. 61/119,799, filed on Dec. 4, 2008.

(51) Int. Cl.
*H04L 27/28* (2006.01)

(52) U.S. Cl. ...................................... 375/260

(58) Field of Classification Search .................. 375/260, 375/267; 455/452.1, 452.2, 522
See application file for complete search history.

(56) References Cited

U.S. PATENT DOCUMENTS

| 2009/0213805 A1* | 8/2009 | Zhang et al. | 370/329 |
| 2010/0041428 A1* | 2/2010 | Chen et al. | 455/522 |
| 2010/0113057 A1* | 5/2010 | Englund et al. | 455/452.1 |
| 2010/0120446 A1* | 5/2010 | Gaal | 455/452.2 |

FOREIGN PATENT DOCUMENTS

EP 1 912 345 A1 4/2008

OTHER PUBLICATIONS

Ericsson, "Carrier aggregation in LTE-Advanced," TSG-RAN WG1 #53bis, R1-082468 (Jun. 2008).

Third Generation Partnership Project, "3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.3.0 (Sep. 2008).

(Continued)

*Primary Examiner* — Don N Vo
(74) *Attorney, Agent, or Firm* — Condo Roccia LLP

(57) ABSTRACT

A method for reporting power headroom is disclosed. Power headroom may be reported across all carriers (wideband), for a specific carrier, or for a carrier group. The formula used to calculate the power headroom depends on whether the carrier (or a carrier in the carrier group) has a valid uplink grant. If the carrier or carrier group does not have a valid uplink grant, the power headroom may be calculated based on a reference grant. The power headroom is calculated by a wireless transmit/receive unit and is reported to an eNodeB.

44 Claims, 6 Drawing Sheets

OTHER PUBLICATIONS

Third Generation Partnership Project, "3rd Generation Partnership Project; Technical Specification Group Radio Access Network; Evolved Universal Terrestrial Radio Access (E-UTRA) Medium Access Control (MAC) protocol specification (Release 9)," 3GPP TS 36.321 V9.0.0 (Sep. 2009).

Third Generation Partnership Project, "Technical Specification Group Radio Access Network; Evolved Universal Terrestrial Radio Access (E-UTRA); Physical layer procedures (Release 8)," 3GPP TS 36.213 V8.5.0 (Dec. 2008).

Third Generation Partnership Project, "Technical Specification Group Radio Access Network; Evolved Universal Terrestrial Radio Access (E-UTRA); Physical layer procedures (Release 9)," 3GPP TS 36.213 V9.0.1 (Dec. 2009).

3$^{rd}$ Generation Partnership Project (3GPP), LTE; Evolved Universal Terrestrial Radio Access (E-UTRA); Physical Layer Procedures (3GPP TS 36.213 version 8.4.0 Release 8), ETSI TS 136 213, V8.4.0, Nov. 2008, 1-61.

3$^{rd}$ Generation Partnership Project (3GPP), "Uplink Power Control for Carrier Aggregation", R1-093297, 3GPP TSG RAN WG1, Meeting #58, Shenzhen, China, Aug. 24-28, 2009, 1-4.

* cited by examiner

UPLINK POWER HEADROOM REPORTING FOR CARRIER AGGREGATION

CROSS REFERENCE TO RELATED APPLICATIONS

This application claims the benefit of U.S. Provisional Application No. 61/119,471, filed Dec. 3, 2008, and U.S. Provisional Application No. 61/119,799, filed Dec. 4, 2008, which are incorporated by reference as if fully set forth herein.

FIELD OF INVENTION

This application is related to wireless communications.

BACKGROUND

This disclosure relates to uplink (UL) power headroom (PH) reporting for carrier aggregation in wireless communications, in particular with reference to Long Term Evolution Advanced (LTE-A). Power headroom is the difference between a wireless transmit/receive unit's (WTRU's) maximum transmit power and the estimated power for a physical UL shared channel (PUSCH) transmission in the current sub-frame. A power headroom report (PHR) is an index reported by the WTRU to indicate the estimated PH. The WTRU sends the PHR to an evolved Node B (eNodeB or eNB), which may use the PHR to determine how much more UL bandwidth per subframe the WTRU is capable of using.

To support higher data rates and spectrum efficiency, the 3GPP long term evolution (LTE) system has been introduced into 3GPP Release 8 (R8). To further improve achievable throughput and coverage of LTE-based radio access systems, and to meet the International Mobile Telecommunications (IMT)-Advanced requirements of 1 Gbps and 500 Mbps in the downlink (DL) and UL directions respectively, LTE-Advanced (LTE-A) is currently under study in the 3GPP standardization body.

The LTE DL transmission scheme is based on an orthogonal frequency divisional multiple access (OFDMA) air interface. For the LTE UL direction, single-carrier (SC) transmission based on discrete Fourier transform (DFT)-spread OFDMA (DFT-S-OFDMA) is used. The use of single-carrier transmission in the UL is motivated by the lower peak to average power ratio (PAPR) or cubic metric (related to the non-linearity of a power amplifier) of the signal as compared to a multi-carrier transmission scheme such as OFDM.

For flexible deployment, LTE systems support scalable transmission bandwidths of either 1.4, 3, 5, 10, 15, or 20 MHz. The LTE system may operate in either frequency division duplex (FDD), time division duplex (TDD), or half-duplex FDD modes.

In an LTE system, each radio frame (10 ms) consists of ten equally sized sub-frames of 1 ms. Each sub-frame consists of two equally sized timeslots of 0.5 ms each. There may be either seven or six OFDM symbols per timeslot. Seven symbols are used with a normal cyclic prefix length, and six symbols per timeslot in an alternative system configuration may be used with an extended cyclic prefix length. The sub-carrier spacing for the LTE system is 15 kHz. An alternative reduced sub-carrier spacing mode using 7.5 kHz is also possible. A resource element (RE) corresponds to precisely one sub-carrier during one OFDM symbol interval. Twelve consecutive sub-carriers during a 0.5 ms timeslot constitute one resource block (RB). Therefore, with seven symbols per timeslot, each RB consists of 12×7=84 REs. A DL carrier may consist of a scalable number of resource blocks (RBs), ranging from a minimum of six RBs up to a maximum of 110 RBs. This corresponds to an overall scalable transmission bandwidth of roughly 1 MHz up to 20 MHz, but a set of common transmission bandwidths is usually specified, e.g., 1.4, 3, 5, 10, 15, or 20 MHz. The basic time-domain unit for dynamic scheduling in LTE is one sub-frame consisting of two consecutive timeslots. This is referred to as an RB pair. Certain sub-carriers on some OFDM symbols are allocated to carry pilot signals in the time-frequency grid. A given number of sub-carriers at the edges of the transmission bandwidth are not transmitted to comply with the spectral mask requirements.

In the DL direction, a WTRU may be allocated by an eNodeB to receive its data anywhere across the whole transmission bandwidth, e.g., an OFDMA scheme is used. The DL has an unused direct current (DC) offset sub-carrier in the center of the spectrum.

In the UL direction, LTE is based on DFT-S-OFDMA, or equivalently, SC-FDMA transmission. The purpose is to achieve a lower PAPR compared to the OFDMA transmission format. Conceptually, whereas in the LTE DL direction, a WTRU may receive its signal anywhere across the frequency domain in the whole LTE transmission bandwidth, a WTRU in the UL may transmit only on a limited contiguous set of assigned sub-carriers in an FDMA arrangement. This principle is called single carrier (SC)-FDMA. For example, if the overall OFDM signal or system bandwidth in the UL is composed of sub-carriers numbered 1 to 100, a first WTRU may be assigned to transmit its own signal on sub-carriers 1-12, a second WTRU may transmit on sub-carriers 13-24, and so on. An eNodeB receives a composite UL signal across the entire transmission bandwidth from one or more WTRUs at the same time, but each WTRU may only transmit into a subset of the available transmission bandwidth. In principle, DFT-S OFDM in the LTE UL may therefore be seen as a conventional form of OFDM transmission with the additional constraint that the time-frequency resource assigned to a WTRU consists of a set of frequency-consecutive sub-carriers. In the LTE UL, there is no DC sub-carrier (unlike the DL). Frequency hopping may be applied in one mode of operation to UL transmissions by a WTRU.

One improvement proposed for LTE-A is carrier aggregation and support for flexible bandwidth. One motivation for these changes is to allow DL and UL transmission bandwidths to exceed the 20 MHz maximum of R8 LTE, e.g., to allow a 40 MHz bandwidth. A second motivation is to allow for more flexible usage of the available paired spectrum. For example, whereas R8 LTE is limited to operate in symmetrical and paired FDD mode, e.g., DL and UL are both 10 MHz or 20 MHz in transmission bandwidth each, LTE-A may operate in asymmetric configurations, such as DL 10 MHz paired with UL 5 MHz. In addition, composite aggregate transmission bandwidths may also be possible with LTE-A, e.g., in the DL, a first 20 MHz carrier and a second 10 MHz carrier paired with an UL 20 MHz carrier and so on. The composite aggregate transmission bandwidths may not necessarily be contiguous in the frequency domain, e.g., the first 10 MHz component carrier in the above example may be spaced by 22.5 MHz in the DL band from the second 5 MHz DL component carrier. Alternatively, operation in contiguous aggregate transmission bandwidths may also be possible, e.g., a first DL component carrier of 20 MHz is aggregated with a contiguous 10 MHz DL component carrier and paired with a UL carrier of 20 MHz.

Examples of different configurations for LTE-A carrier aggregation and support for flexible bandwidth are illustrated in FIG. 1. FIG. 1a depicts three component carriers, two of which are contiguous and a third which is not contiguous. FIGS. 1b and 1c both depict three contiguous component carriers. There are two options for extending the LTE R8 transmission structure/format to incorporate the aggregated component carriers. One option is to apply the DFT precoder to the aggregate bandwidth, e.g., across all the component carriers in case the signal is contiguous, as shown in FIG. 1b and the right side of FIG. 1a. A second option is to apply the DFT precoder per component carrier only, as shown in FIG. 1c. It is noted that different carriers may have different modulation and coding sets (MCSs; i.e., a carrier-specific MCS), as shown in FIG. 1c.

In the R8 LTE system UL direction, WTRUs transmit their data (and in some cases their control information) on the PUSCH. The PUSCH transmission is scheduled and controlled by the eNodeB using the UL scheduling grant, which is carried on physical DL control channel (PDCCH) format 0. As part of the UL scheduling grant, the WTRU receives control information including the modulation and coding set (MCS), transmit power control (TPC) command, UL resource allocation (i.e., the indices of allocated resource blocks), etc. The WTRU transmits its PUSCH on the allocated UL resources with the corresponding MCS at the transmit power controlled by the TPC command.

For scheduling UL WTRU transmissions, the scheduler at the eNodeB needs to select an appropriate transport format (i.e., MCS) for a certain resource allocation. For this, the scheduler needs to be able to estimate the UL link quality for the scheduled WTRU.

This requires that the eNodeB has knowledge of the WTRU's transmit power. In LTE, the estimated WTRU transmit power is calculated according to a formula where the eNodeB has knowledge of all components in the formula except for the WTRU's estimate of the DL pathloss. In LTE, a WTRU measures and reports back its DL pathloss estimate to the eNodeB in the form of a PH measurement reporting quantity. This is similar to the concept of PH reporting in wideband code division multiple access (WCDMA) Release 6, where the PH is also reported for the eNodeB to perform appropriate UL scheduling.

In LTE, the PH reporting procedure is used to provide the serving eNodeB with information about the difference between the WTRU's transmit power and the maximum WTRU transmit power (for positive PH values). The information may also include the difference between the maximum WTRU transmit power and the calculated WTRU transmit power, according to the UL power control formula, when it exceeds the maximum WTRU transmit power (for negative PH values).

As explained above, in LTE, a single component carrier is used; therefore the definition of WTRU PH is based on one carrier. The WTRU transmit power $P_{PUSCH}$ for the PUSCH transmission in subframe i is defined by:

$$P_{PUSCH}(i) = \min\{P_{CMAX}, 10\log_{10}(M_{PUSCH}(i)) + P_{O\_PUSCH}(j) + \alpha(j) \times PL + \Delta_{TF}(i) + f(i)\} \quad \text{Equation (1)}$$

where $P_{CMAX}$ is the configured maximum allowed WTRU transmit power. $P_{CMAX}$ depends on the WTRU power class, allowed tolerances and adjustments, and a maximum allowed transmit power signaled to the WTRU by the eNodeB.

$M_{PUSCH}(i)$ is the bandwidth of the PUSCH resource assignment expressed in the number of resource blocks valid for subframe i.

$P_{O\_PUSCH}(j)$ is the sum of a cell-specific nominal component $P_{O\_NOMINAL\_PUSCH}(j)$ and a WTRU specific-component $P_{O\_UE\_PUSCH}(j)$. $P_{O\_NOMINAL\_PUSCH}(j)$ is signaled from higher layers for j=0 and 1 in the range of [−126, 24] dBm with 1 dB resolution and $P_{O\_UE\_PUSCH}(j)$ is configured by radio resource control (RRC) for j=0 and 1 in the range of [−8, 7] dB with 1 dB resolution. For PUSCH (re)transmissions corresponding to a configured scheduling grant, j=0 and for PUSCH (re)transmissions corresponding to a received PDCCH with DCI format 0 associated with a new packet transmission, j=1. For PUSCH (re)transmissions corresponding to the random access response grant, j=2. $P_{O\_UE\_PUSCH}(2)=0$ and $P_{O\_NOMINAL\_PUSCH}(2)=P_{O\_PRE}+\Delta_{PREAMBEE\_Msg3}$, where $P_{O\_PRE}$ and $\Delta_{PREAMBLE\_Msg3}$ are signaled from higher layers.

For j=0 or 1, $\alpha \in \{0, 0.4, 0.5, 0.6, 0.7, 0.8, 0.9, 1\}$ is a three bit cell-specific parameter provided by higher layers. For j=2, $\alpha(j)=1$.

PL is the DL pathloss estimate calculated by the WTRU. $\Delta_{TF}(i) = 10\log_{10}((2^{MPR \times K_S}-1) \times \beta_{offset}^{PUSCH})$ for $K_S=1.25$ and $\Delta_{TF}(i)=0$ for $K_S=0$, where $K_S$ is a WTRU-specific parameter given by RRC.

$$MPR = \frac{O_{CQI}}{N_{RE}}$$

for control data sent via the PUSCH without UL shared channel (UL-SCH) data, where $O_{CQI}$ is the number of CQI bits, including CRC bits, and $N_{RE}$ is the number of resource elements.

$$MPR = \sum_{r=0}^{C-1} \frac{K_r}{N_{RE}}$$

for other cases, where C is the number of code blocks and $K_r$ is the size for code block r. $\beta_{offset}^{PUSCH} = \beta_{offset}^{CQI}$ for control data sent via the PUSCH without UL-SCH and $\beta_{offset}^{PUSCH}=1$ for other cases.

$f(i)=\delta_{PUSCH}(i-K_{PUSCH})$ if accumulation of TPC commands is not enabled based on the WTRU-specific parameter Accumulation-enabled provided by higher layers. $\delta_{PUSCH}$ is a WTRU-specific correction value, also referred to as a TPC command and is signaled to the WTRU in the PDCCH. $K_{PUSCH}$ is a subframe offset such that the value of f(i) in the current subframe i is the $\delta_{PUSCH}$ value received $K_{PUSCH}$ frames before the current frame i. For FDD, $K_{PUSCH}=4$ and for TDD, the value of $K_{PUSCH}$ varies.

The WTRU PH for subframe i is defined by:

$$PH(i) = P_{CMAX} - \{10\log_{10}(M_{PUSCH}(i)) + P_{O\_PUSCH}(j) + \alpha \times PL + \Delta_{TF}(i) + f(i)\} \quad \text{Equation (2)}$$

The WTRU transmit power for the PUSCH in subframe i required by the UL scheduling grant (including radio bearer (RB) allocation, MCS, and power control command) without taking into account any maximum transmit power limitations, is denoted as $P_{PUSCH\_UG}(i)$, and is defined as $$P_{PUSCH\_UG}(i) = 10\log_{10}(M_{PUSCH}(i)) + P_{O\_PUSCH}(j) + \alpha(j) \times PL + \Delta_{TF}(i) + f(i) \quad \text{Equation (3)}$$

Then, the actual WTRU transmit power on the PUSCH in Equation 1 may be rewritten as:

$$P_{PUSCH}(i) = \min\{P_{CMAX}, P_{PUSCH\_UG}(i)\} \quad \text{Equation (4)}$$

The PH formula for LTE in Equation 2 may be rewritten as:

$$PH(i) = P_{CMAX} - P_{PUSCH\_UG}(i) \quad \text{Equation (5)}$$

The existing definition of PH in LTE has been designed for the specific case of the SC-FDMA (or DFT-S OFDMA) air interface provided by R8 LTE. As such, it specifically applies to only one component carrier and only results in one single value measured and reported back by a WTRU for its entire UL direction and for a single multiple access scheme (one transmit antenna SC-FDMA). But this approach is not applicable to an LTE-A system using carrier aggregation, new multiple access schemes, MIMO schemes, or when operating in flexible bandwidth arrangements, where the eNodeB needs to know the PH information for multiple component carriers and/or multiple power amplifiers (PAs) to schedule and assign UL transmissions for the WTRU with the appropriate transmit power levels.

For example, suppose that three carriers are aggregated and used in an LTE-A system. The WTRU may have different maximum transmit powers on different carriers or have different pathloss values and/or open loop power control parameters leading to different transmit power levels on different carriers. At one sub-frame, the eNodeB may schedule the WTRU to transmit on two carriers (e.g., carriers 1 and 2). Given that the two carriers have different transmit powers, a single PH value would not be able to indicate the difference between the WTRU's maximum transmit power and the calculated transmit power (according to the power control formula) on each of the two carriers. Furthermore, when the eNodeB wants to schedule a future UL transmission on carrier 3, it will not know the PH information on carrier 3 (because the PH may not be reported, according to the concept in LTE). If carrier 3 is not contiguous to carriers 1 and 2, the DL pathloss on carrier 3 may not be derived reliably from the PH on carriers 1 and 2. The pathloss difference in non-contiguous carrier aggregation may be large, such as greater than 7 or 9 dB. This makes it difficult for the eNodeB to schedule UL transmissions with optimized power levels because the WTRU measured and reported PH value is not a representative metric equally valid for all the UL carriers assigned to that WTRU.

In addition to the existing reported PH values not being sufficient to accommodate multiple carriers, the signaling related to PH reporting is also insufficient. In an LTE system, transmission by the WTRU of a single value PHR for the entire cell bandwidth is triggered in one of the following ways: periodically (controlled by the PERIODIC PHR TIMER), if the pathloss has changed more than DL_PathlossChange dB since the last PHR and a predefined time has elapsed since the last report (controlled by the PROHIBIT_PHR_TIMER), or upon configuration and reconfiguration of a periodic PHR. Even if multiple events occur by the time a PHR may be transmitted, only one PHR is included in the MAC protocol data unit (PDU).

Methods and procedures are needed to estimate and report representative PH information when multiple carriers are assigned to a WTRU in an LTE-A system incorporating carrier aggregation. Furthermore, the transmission and signaling of the PH information also needs to be addressed to support efficient PH reporting in LTE-A.

SUMMARY

A method for reporting power headroom is disclosed. Power headroom may be reported across all carriers (wideband), for a specific carrier, or for a carrier group. The formula used to calculate the power headroom depends on whether the carrier (or a carrier in the carrier group) has a valid uplink grant. If the carrier or carrier group does not have a valid uplink grant, the power headroom may be calculated based on a reference grant. The power headroom is calculated by a wireless transmit/receive unit and is reported to an eNodeB.

BRIEF DESCRIPTION OF THE DRAWINGS

A more detailed understanding may be had from the following description, given by way of example in conjunction with the accompanying drawings wherein.

DETAILED DESCRIPTION

Figure 1A:
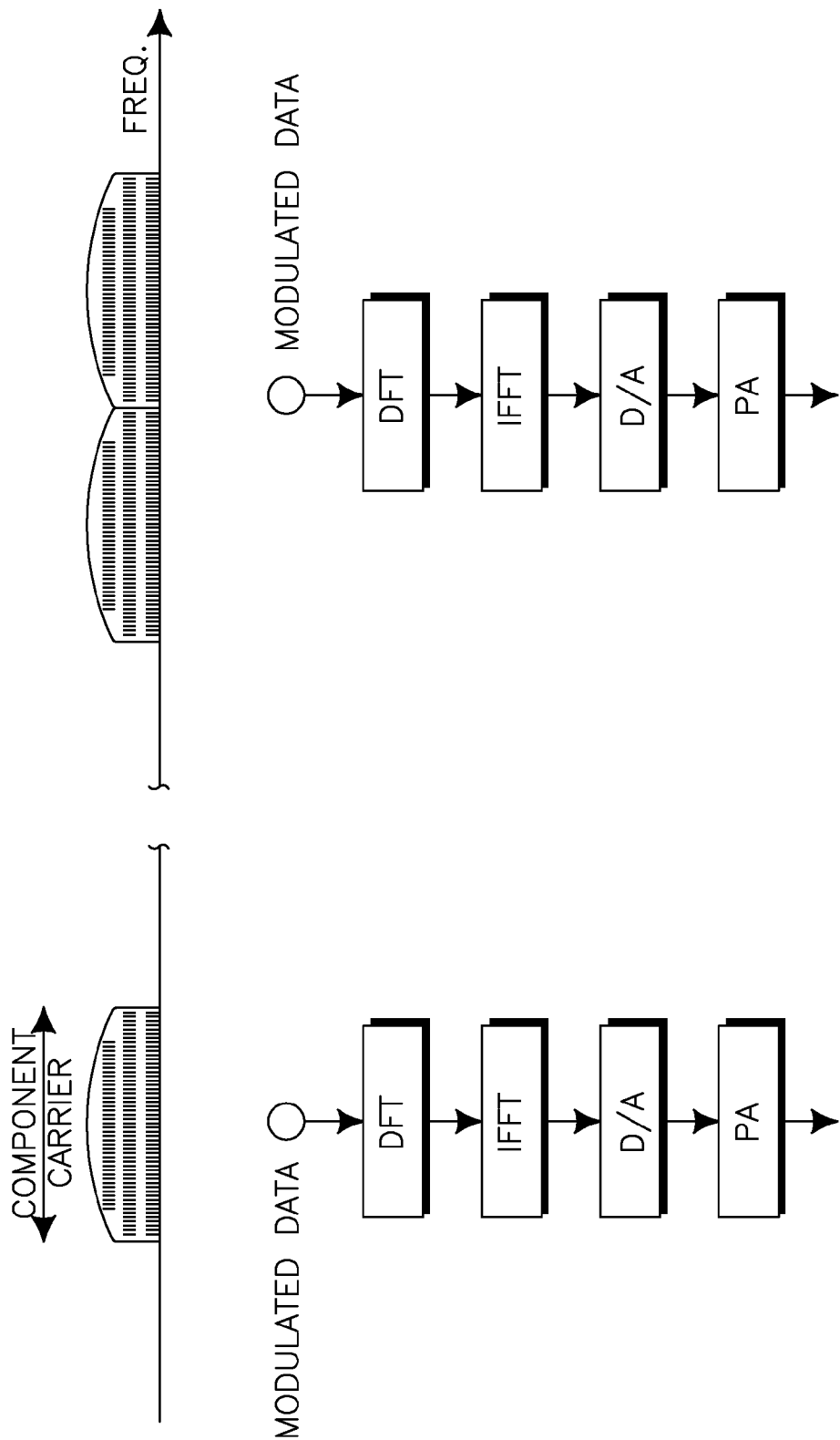
FIGS. 1a-1c show different example configurations for LTE-A carrier aggregation.
Figure 1B:
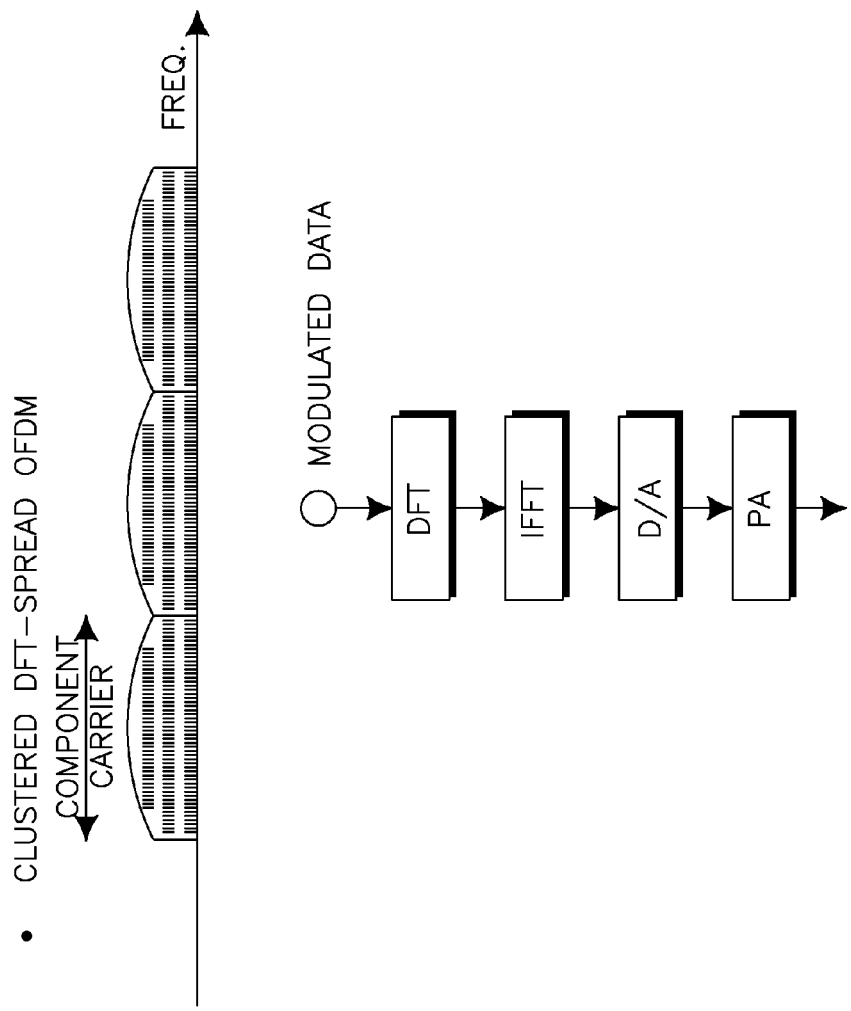
Figure 1C:
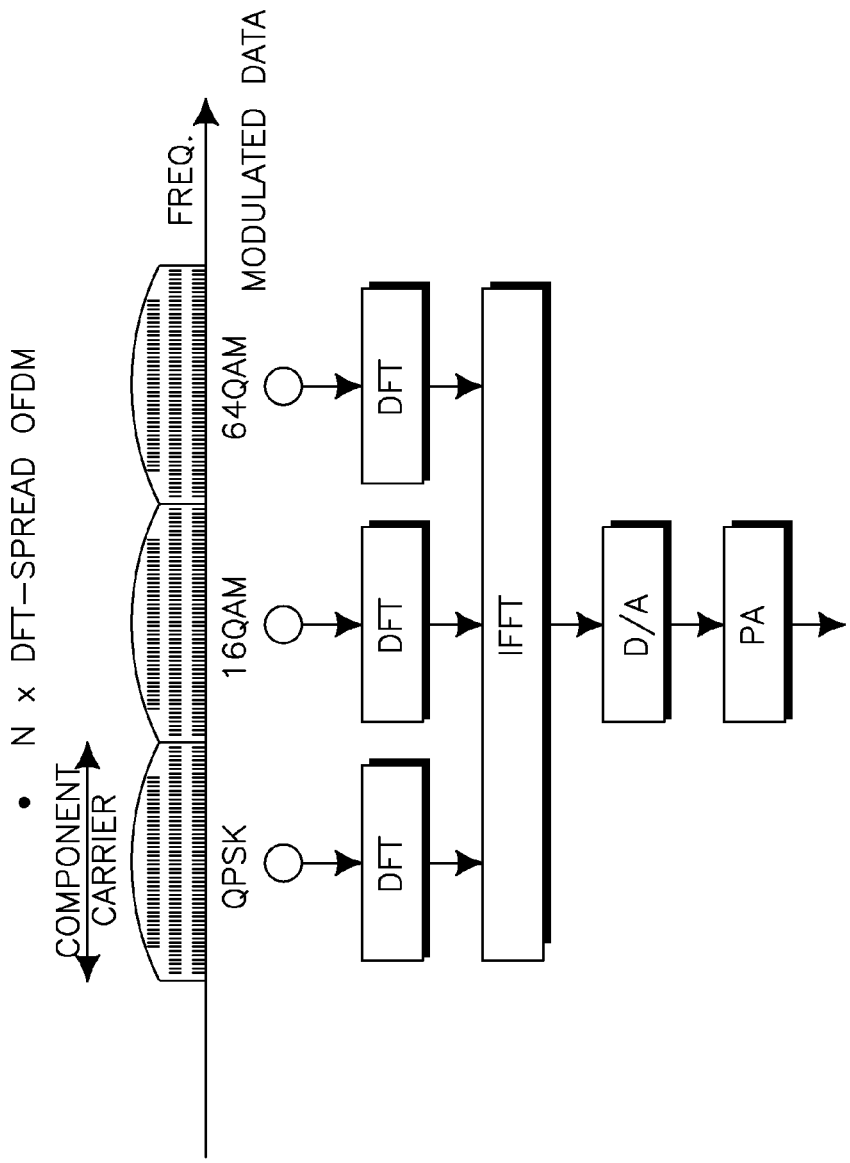

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, an eNode B, a site controller, an access point (AP), or any other type of interfacing device capable of operating in a wireless environment.

The maximum transmit power of a WTRU may be limited by any combination of the following: WTRU power class definition, allowed value or values provided by higher layer configuration, or limitation by the WTRU's PA(s). The eNodeB may configure the maximum WTRU transmit power per carrier, per carrier group, or for all carriers using higher layer signaling (e.g., RRC signaling).

With regard to carrier grouping, one grouping method is such that contiguous carriers are grouped together. A second method is such that when multiple carriers share the same PA, the carriers may be a group. If the WTRU has different PAs controlling different UL carriers, then the WTRU may need to report the PA association with the carriers at initial network access (RRC connection setup), handover (RRC connection reconfiguration), or other RRC reestablishment events.

Alternatively, the PA association with the carriers (i.e., CC-to-PA mapping) may be provided by the eNodeB via higher layer signaling if the mapping is determined in the eNodeB. For example, consider the case of a WTRU transmitting on J component carriers (CCs) (where $J \geq 1$) using L PAs (where $L \geq 1$). The mapping of J CCs to L PAs may be signaled by the WTRU to the eNodeB, if the mapping is determined in the WTRU. Alternatively, the mapping may be signaled by the eNodeB to the WTRU if the mapping is determined in the eNodeB. Alternatively, the mapping may be independently derived by both the WTRU and the eNodeB based on pre-defined rules that are a function of configuration, such as WTRU category and/or carrier allocation. The number of the PAs at the WTRU may be derivable by the eNodeB from the WTRU category information signaled, for example, by the WTRU as part of the WTRU capability information. Alternatively, the WTRU may explicitly signal the number of PAs and their characteristics, e.g., maximum transmit power, to the eNodeB.

Defining and calculating the PH needs to reflect the difference between the WTRU maximum transmit power and the calculated WTRU transmit power according to the UL power control formula which can be defined for specific carriers, across carriers associated with distinct PAs, or across all carriers. Three basic scenarios are defined for the maximum transmit power limitation. For each of these scenarios, methods for calculating and reporting the PH are provided. PH calculations and reporting are performed by the WTRU.

Scenario 1

The sum of the WTRU's transmit power on all aggregated carriers is subject to a pre-defined and/or configured maximum transmit power, $P_{CMAX}$. As in LTE, $P_{CMAX}$ may depend on some combination of the WTRU power class, allowed tolerances and adjustments, and a maximum allowed transmit power (possibly per carrier group) signaled to the WTRU by the eNodeB. This scenario could correspond to the case where there is only one radio frequency (RF) PA controlling WTRU transmit signal amplification/power on all aggregated carriers or a maximum transmit power is configured for all carriers by higher layer signaling. In this scenario, the sum of the WTRU's transmit power on all aggregated carriers is limited to $P_{CMAX}$.

Method 1.A

In this method, the wideband PH for the WTRU in subframe i is defined as:

$$PH_{WB}(i) = P_{CMAX} - 10\log_{10}\left\{\sum_{k \in \Omega} 10^{\frac{P_{PUSCH\_UG}(k,i)}{10}}\right\} \qquad \text{Equation (6)}$$

where k is a carrier number in a range of k=1, ..., K, $\Omega$ is the set of active carriers (each having a UL grant for subframe i), and $P_{PUSCH\_UG}(k,i)$ is the transmit power for the PUSCH to be transmitted on carrier k in subframe i prior to taking into account power limitations. The PH is computed by the WTRU for a particular transmission, based on the current UL grant(s) to the WTRU, where different UL grants may be allocated to different carriers.

When the eNodeB changes the UL grant, either by increasing or decreasing the amount of bandwidth available to the WTRU or the modulation and coding set (MCS) level, the eNodeB knows the available power of the WTRU based on the reported PH. This wideband PH reporting has a benefit of minimizing signaling overhead by reporting a single value.

Method 1.B

In this method, a PH per carrier is defined. For each UL carrier k that has a valid UL grant (and therefore has a PUSCH transmission) in subframe i, its PH is defined as:

$$PH(k,i) = P_{CMAX\_carrier}(k) - P_{PUSCH\_UG}(k,i) \qquad \text{Equation (7)}$$

where $P_{CMAX\_carrier}(k)$ is the configured maximum WTRU transmit power of the k-th carrier, which may be defined as:

$$P_{CMAX\_carrier}(k) = 10\log_{10}\left(\left(\frac{BW_k}{\sum_{k=1,K,K} BW_k}\right) \times 10^{\frac{P_{CMAX}}{10}}\right) \qquad \text{Equation (7a)}$$

or $$P_{CMAX\_carrier}(k) = 10\log_{10}\left(\left(\frac{BW_k}{\sum_{k \in \Omega} BW_k}\right) \times 10^{\frac{P_{CMAX}}{10}}\right) \qquad \text{Equation (7b)}$$

where $BW_k$ is the bandwidth for carrier k. The definition of $P_{CMAX\_carrier}(k)$ in Equation 7a is used for all sub-bands or carriers (k=1, K) across all PAs at the WTRU. The definition of $P_{CMAX\_carrier}(k)$ in Equation 7b is used for the subset of carriers (i.e., the carriers in the set $\Omega$), for example, that share the same PA. When each carrier has the same bandwidth, $P_{CMAX\_carrier}(k)$ is identical for all the carriers of interest. Alternatively, $P_{CMAX\_carrier}(k)$ may be configured differently or independently for each carrier k, but the sum of $P_{CMAX\_carrier}(k)$ for all carriers k or k in $\Omega$ is subject to the total maximum transmit power $P_{CMAX}$, that is $$\sum_{k=1,K,K} P_{CMAX\_carrier}(k) \leq P_{CMAX}$$

for Equation (7a) and $$\sum_{k \in \Omega} P_{CMAX\_carrier}(k) \leq P_{CMAX}$$

for Equation (7b). Alternatively, $P_{CMAX\_carrier}(k)$ may be set to a constant value for all k for simplicity.

As described above, the PH may be calculated by the WTRU based on the current UL grant given to the WTRU for each UL component carrier, where the UL grant is provided to the WTRU by the eNodeB. Equation 7 is for this case. Alternatively, if no current grant is given, a recent or latest UL grant may be used instead in the same equation. Alternatively, the PH may be calculated by using a reference UL scheduling grant rather than being based on the actual grant. For example: $PH_{RG}(k,i) = P_{CMAX\_carrier}(k) - P_{PUSCH\_RG}(k,i)$, where $P_{PUSCH\_RG}(k,i)$ is the transmit power that may be determined based on a reference grant allocation in carrier k in which an UL transmission is made. The reference grant is an assumption that the WTRU and the eNodeB previously agree upon (e.g., pre-defined, signaled) as a reference to use when reporting the PH.

For each UL carrier k that has no UL grant, the WTRU may optionally report its PH, which is determined based on reference grant parameters (PUSCH assignment, transport format, etc.) as follows:

$$PH(k,i) = P_{CMAX\_carrier}(k) - P_{PUSCH\_}^{REF}(k,i) \qquad \text{Equation (8)}$$

where $P_{PUSCH\_REF}(k,i)$ is defined as $$P_{PUSCH\_REF}(k,i) = f_{1\_REF}(P_{PUSCH\_REF}(n,i)) + \alpha \times (PL(k) - f_{2\_REF}(PL(n))) \qquad \text{Equation (9)}$$

where n≠k and carrier n belongs to the set of carriers with a valid uplink grant. $\alpha$ is a cell-specific parameter. PL(k) is the pathloss estimate calculated by the WTRU on carrier k. If the variance in the pathloss between different carriers is not significantly different (e.g., less than 1 dB), a single PL value for the carriers may be used for simplicity. Carrier n belongs to the set of carriers with a valid UL grant, $f_{1\_REF}(*)$ is a function of a reference carrier-specific WTRU transmit power, and $f_{2\_REF}(*)$ is a function of a reference carrier-specific pathloss. The reference functions may be, but are not limited to, any one of the following: a fixed value reference, parameters of one of the UL carriers that have a valid UL grant, or an average value of parameters of all UL carriers that have a valid UL grant.

Method 1.C

In this method, a PH per group of carriers is defined. In particular, contiguous carriers or carriers sharing the same PA may be grouped together. Suppose that a carrier group m has a set of carriers denoted as $\Omega_m$. For each UL carrier group m that has a UL grant for at least one of the carriers in the group, its PH is defined as:

$$PH(m, i) = 10\log_{10}\left(\sum_{k \in \Omega_m} 10^{\frac{P_{CMAX\_carrier}(k)}{10}}\right) - \\ 10\log_{10}\left(\sum_{k \in \Omega_m} 10^{\frac{P_{PUSCH\_UG}(k,i)}{10}}\right)$$  Equation (10)

where $P_{CMAX\_carrier}(k)$ is defined as in Equations 7a or 7b. For a particular carrier without a valid UL grant, its transmit power may be zero (i.e., $P_{PUSCH\_UG}(k,i)=0$ for carrier k that does not have a UL grant in subframe i).

For each UL carrier group m that has no UL grant for any carrier in the group, the PH for the carrier group may be determined and reported based on reference grant parameters as:

$$PH(m, i) = 10\log_{10}\left(\sum_{k \in \Omega_m} 10^{\frac{P_{CMAX\_carrier}(k)}{10}}\right) - \\ 10\log_{10}\left(\sum_{k \in \Omega_m} 10^{\frac{P_{PUSCH\_REF}(k,i)}{10}}\right)$$  Equation (11)

Typically, carrier group-specific PH reporting may be used for the case where carriers within a group are contiguous (and possibly have similar UL grants) so that their transmit power levels are close to each other (leading to PH values being similar to each other). With carrier group-specific PH reporting, the PH reporting overhead is less than that with carrier-specific PH reporting.

Method 1.D

Combining the wideband and carrier (or carrier group) specific methods may be used. For example: reporting wideband PH and carrier-specific PH values, or reporting wideband PH and carrier group-specific PH values.

There may be advantages to a combined reporting, which depend on the nature of the communication within the eNodeB. If each carrier is transmitted separately, possibly with its own UL grant, there may be a benefit of providing a total transmit power measurement (through the wideband PH report) along with a carrier-specific transmit power measurement (through the CC specific PH report). By using a combined report, the eNodeB may obtain this information without requiring additional internal processing of the PH report within the eNodeB. The eNodeB may configure each WTRU with respect to how the WTRU reports the PH (e.g., either reporting wideband PH, per-carrier PH, per-carrier group PH, or a combination of them).

Scenario 2

The total WTRU transmit power on carrier group m is subject to a pre-defined and/or configured maximum transmit power $P_{CMAX}(m)$, where $P_{CMAX}(m)$ is the configured maximum allowed WTRU transmit power (in dBm) for carrier group m. $P_{CMAX}(m)$ may depend on some combination of the WTRU power class, allowed tolerances and adjustments, and a maximum allowed transmit power (possibly per carrier group) signaled to the WTRU by the eNodeB. A carrier group may consist of one or more carriers. One reason for several carriers being configured as a carrier group is the case of multiple carriers associated with one RF PA. Alternatively, the grouping of carriers may be configured, for example, by the eNodeB via higher layer signaling, without regard to the carrier-PA association.

Let $\Omega_m$ denote the set of carriers in the carrier group m. For a particular carrier without a valid UL grant, its transmit power may be zero (i.e., $P_{PUSCH\_UG}(k,i)=0$ for carrier k that does not have a UL grant in subframe i).

Method 2.A

In this method, the wideband PH for the WTRU in subframe i is defined as:

$$PH_{WB}(i) = 10\log_{10}\left(\sum_m 10^{\frac{P_{MAX}(m)}{10}}\right) - \\ 10\log_{10}\left(\sum_{k \in \Omega_m} 10^{\frac{P_{PUSCH\_UG}(k,i)}{10}}\right)$$  Equation (12a)

or $$PH_{WB}(i) = 10\log_{10}\left(\sum_m 10^{\frac{P_{CMAX}(m)}{10}}\right) - \\ 10\log_{10}\left(\sum_m \sum_{k \in \Omega_m} 10^{\frac{P_{PUSCH\_UG}(k,i)}{10}}\right)$$  Equation (12b)

Alternatively, $$PH_{WB}(i) = 10\log_{10}\left(\frac{1}{M}\sum_m 10^{\frac{P_{CMAX}(m)}{10}}\right) - \\ 10\log_{10}\left(\sum_{k \in \Omega_m} 10^{\frac{P_{PUSCH\_UG}(k,i)}{10}}\right)$$  Equation (13a)

or $$PH_{WB}(i) = 10\log_{10}\left(\frac{1}{M}\sum_m 10^{\frac{P_{CMAX}(m)}{10}}\right) - \\ 10\log_{10}\left(\sum_m \sum_{k \in \Omega_m} 10^{\frac{P_{PUSCH\_UG}(k,i)}{10}}\right)$$  Equation (13b)

where M is the number of carrier groups.

The WTRU may optionally report a wideband PH for the carriers without a UL grant, which is denoted as $PH_{WB\_NG}(i)$.

$$PH_{WB\_NG}(i) = 10\log_{10}\left(\sum_m 10^{\frac{P_{CMAX}(m)}{10}}\right) - \\ 10\log_{10}\left(\sum_{k \notin \Omega} 10^{\frac{P_{PUSCH\_REF}(k,i)}{10}}\right)$$  Equation (14)

where $P_{PUSCH\_REF}(k,i)$ is as defined previously. Recalling that k is a carrier number, where k=1, . . . , K, and $\Omega$ is the set of active carriers (each having a UL grant for subframe i), the computed UL power in Equation 14 is a summation over the subset of carriers in the set of k=1, . . . , K, that are not in the set of active carriers $\Omega$.

Method 2.B

In this method, a PH per carrier group is defined. For each UL carrier group m that has a valid UL grant for one or more carriers in the group (and therefore has a PUSCH transmission) in subframe i, its PH is defined as:

$$PH(m, i) = P_{CMAX}(m) - 10\log_{10}\left(\sum_{k \in \Omega_m} 10^{\frac{P_{PUSCH\_UG}(k,i)}{10}}\right) \quad \text{Equation (15)}$$

where $P_{CMAX}(m)$ is as defined previously.

For each UL carrier group m that has no UL grant for any carrier in the group, the WTRU may optionally report its PH, which is defined based on reference grant parameters (PUSCH assignment, transport format, etc.) as:

$$PH(m, i) = P_{CMAX}(m) - 10\log_{10}\left(\sum_{k \in \Omega_m} 10^{\frac{P_{PUSCH\_REF}(k,i)}{10}}\right) \quad \text{Equation (16)}$$

where $P_{PUSCH\_REF}(k,i)$ is defined as in Equation 9.

As mentioned previously, carrier group-specific PH reporting may be used typically for the case where carriers within a group are contiguous (and possibly have similar UL grants) so that their transmit power levels are close to each other (leading to PH values being similar to each other).

Method 2.C

In this method, a PH per carrier is defined. For UL carrier k in $\Omega_m$ that has a valid UL grant (and therefore has a PUSCH transmission) in subframe i, its PH is defined as:

$$PH(k,i) = P_{CMAX\_carrier}(k) - P_{PUSCH\_UG}(k,i) \quad \text{Equation (17)}$$

where $P_{CMAX\_carrier}(k)$ is the configured maximum WTRU transmit power of the k-th carrier in $\Omega_m$, which may be defined as:

$$P_{CMAX\_carrier}(k) = 10\log_{10}\left(\left(\frac{BW_k}{\sum_{k \in \Omega_m} BW_k}\right) \times 10^{\frac{P_{CMAX}(m)}{10}}\right) \quad \text{Equation (17a)}$$

or $$P_{CMAX\_carrier}(k) = 10\log_{10}\left(\left(\frac{BW_k}{\sum_{k \in \Omega_m \cap carrierkhasgrant} BW_k}\right) \times 10^{\frac{P_{CMAX}(m)}{10}}\right) \quad \text{Equation (17b)}$$

where the summation in Equation 17b is applied only for carriers in the carrier group, each carrier having a UL grant.

When each carrier has the same bandwidth, $P_{CMAX\_carrier}(k)$ is the same for all the carriers in $\Omega_m$. Alternatively, $P_{CMAX\_carrier}(k)$ may be configured differently or independently for each carrier k, but the sum of $P_{CMAX\_carrier}(k)$ for all carriers k in $\Omega_m$ is subject to the carrier group maximum transmit power $P_{CMAX}(m)$, that is $$\sum_{k \in \Omega_m} P_{CMAX\_carrier}(k) \leq P_{CMAX}(m)$$

for Equation 17a or $$\sum_{k \in \Omega_m carrierkhasgrant} P_{CMAX\_carrier}(k) \leq P_{CMAX}(m)$$

for Equation 17b. Alternatively, $P_{CMAX\_carrier}(k)$ may be set to a constant value for all k in $\Omega_m$ for simplicity.

For each UL carrier k that has no UL grant, the WTRU may optionally report its PH, which is defined based on reference grant parameters (PUSCH assignment, transport format, etc.) as:

$$PH(k,i) = P_{CMAX\_carrier}(k) - P_{PUSCH\_REF}(k,i) \quad \text{Equation (18)}$$

where $$P_{CMAX\_carrier}(k) = 10\log_{10}\left(\left(\frac{BW_k}{\sum_{k \in \Omega_m} BW_k}\right) \times 10^{\frac{P_{CMAX}(m)}{10}}\right)$$

and $P_{PUSCH\_REF}(k,i)$ is defined as in Equation 9.

Method 2.D

A combination of the wideband and the carrier (or carrier group) specific methods may be used. For example: reporting wideband PH and carrier-specific PH values, or reporting wideband PH and carrier group-specific PH values. The eNodeB may configure each WTRU with respect to how the WTRU reports the PH (e.g., either reporting wideband PH, per-carrier PH, per-carrier group PH, or a combination of them).

Method 2.E

In this method, the PH calculation is based on a reference carrier. As pathloss is dependent on carrier frequency (i.e., the higher the carrier frequency, the larger the pathloss), reporting the PH is based on a reference component carrier, for example, the carrier having the lowest carrier frequency or the carrier having the highest carrier frequency. Power headroom values for the other carriers are calculated and reported relative to the reference carrier. Alternatively, the WTRU reports a PH for the reference carrier and the eNodeB estimates the PH for the other carriers according to the reported reference PH. This method is also applicable to Scenarios 1 and 3.

Scenario 3

The total WTRU transmit power on carrier group m is subject to a pre-defined and/or configured maximum transmit power $P_{CMAX}(m)$. $P_{CMAX}(m)$ may depend on some combination of the WTRU power class, allowed tolerances and adjustments, and a maximum allowed transmit power (possibly per carrier group) signaled to the WTRU by the eNodeB. There may be one or more carriers in the carrier group. Furthermore, the sum of the WTRU transmit power on all aggregated carriers is subject to a pre-defined and/or configured maximum allowed transmit power $P_{CMAX\_total}$, where $$P_{CMAX\_total} \leq 10\log_{10}\left(\sum_m 10^{\frac{P_{CMAX}(m)}{10}}\right) \text{ or }$$

$$P_{CMAX\_total} \leq 10\log_{10}\left(\sum_{k=1,K,K} 10^{\frac{P_{CMAX\_carrier}(k)}{10}}\right).$$

$P_{CMAX\_total}$ may depend on some combination of the WTRU power class, allowed tolerances and adjustments, and a maximum allowed aggregate transmit power signaled to the WTRU by the eNodeB. This scenario could correspond to the case where there is a RF PA controlling WTRU transmit signal amplification/power for a group of one or multiple carriers, a maximum transmit power is configured for each carrier group, and a maximum transmit power is configured for all carriers (or carrier groups).

For convenience of discussion, similar to Equation 3, $P_{PUSCH\_UG}(k,i)$ is used to denote the WTRU transmit power in subframe i on carrier k required by a given UL scheduling grant (RB allocation, MCS, power control command, etc.) before taking into account any maximum transmit power limitations. The exact formula of $P_{PUSCH\_UG}(k,i)$ in LTE-A depends on the power control procedures and formula adopted by the LTE-A standards. In the remaining discussion, the proposed methods are independent of UL power control procedures and the formula used to determine $P_{PUSCH\_UG}(k,i)$.

It is assumed herein that there are K aggregated carriers in the UL, where K≧1. Among the K carriers, M carriers (where M≦K) have valid UL grants in subframe i. Let Ω denote the set of all the carriers with valid UL grants.

Method 3.A

In this method, the wideband PH for the WTRU for subframe i is defined in Equation 6. This wideband PH reporting has a benefit of minimizing signaling overhead by reporting a single value. The WTRU may optionally report a wideband PH on a carrier without an UL grant, which is denoted as $PH_{WB\_NG}(i)$ as defined in Equation 14.

Method 3.B

In this method, a PH per carrier is defined. For each UL carrier k that has a valid UL grant (and therefore has a PUSCH transmission) in subframe i, its PH is defined in Equation 17, furthermore subject to $$P_{CMAX\_total} \leq 10\log_{10}\left(\sum_{k=1,K,K} 10^{\frac{P_{CMAX\_carrier}(k)}{10}}\right).$$

For each UL carrier k that has no UL grant, the WTRU may optionally report its PH, which is defined based on reference parameters (PUSCH assignment, transport format, etc.) in Equation 18, furthermore subject to $$P_{CMAX\_total} \leq 10\log_{10}\left(\sum_{k=1,K,K} 10^{\frac{P_{CMAX\_carrier}(k)}{10}}\right).$$

Method 3.C

In this method, a PH per carrier group is defined. For each UL carrier group m that has a valid UL grant for at least one carrier in the group (and therefore has a PUSCH transmission) in subframe i, its PH is defined in Equation 15, furthermore subject to $$P_{CMAX\_total} \leq 10\log_{10}\left(\sum_{m} 10^{\frac{P_{CMAX}(m)}{10}}\right).$$

For each UL carrier group m that has no UL grant for any carrier in the group, the WTRU may optionally report its PH, which is defined based on reference grant parameters (PUSCH assignment, transport format, etc.) in Equation 16, furthermore subject to $$P_{CMAX\_total} \leq 10\log_{10}\left(\sum_{m} 10^{\frac{P_{CMAX}(m)}{10}}\right).$$

Method 3.D

A combination of wideband and carrier (or carrier group) specific methods may be used. For example, reporting wideband PH and carrier-specific PH values or reporting wideband PH and carrier group-specific PH values. The eNodeB may configure each WTRU with respect to how the WTRU reports the PH (e.g., either reporting wideband PH, per-carrier PH, per-carrier group PH, or a combination of them).

Power Headroom with Consideration of Cubic Metric

In the UL of LTE-A, the single carrier property may be lost due to several factors including carrier aggregation, enhanced multiple access techniques (such as OFDMA or cluster-based DFT-OFDMA), and MIMO. A signal without the single carrier property may typically have a larger cubic metric (CM) than a signal with the single carrier property. Transmitting a signal with such a higher CM, could, depending on WTRU RF PA characteristics, require some degree of derating or backoff from nominal maximum power. To avoid occurrences of the WTRU backing off from nominal maximum power, the PH reporting may include the effect of the higher CM. For example, for the case given in Equation 15 in Method 2.B, the CM may be factored into the PH calculation using:

$$PH(m,i) = P'_{CMAX}(m) - 10 \times \log 10\left\{\sum_{k \in \Omega_m} 10^{\frac{P_{PUSCH\_UG}(k,i)}{10}}\right\} \quad \text{Equation (19)}$$

where $P'_{CMAX\_L} - T(P'_{CMAX\_L}) \leq P'_{CMAX} \leq P_{CMAX\_H} + T(P_{CMAX\_H})$, $P'_{CMAX\_L} = \min(P_{EMAX\_L}, P_{UMAX} - \Delta CM(i))$, $P'_{CMAX\_H} = \min(P_{EMAX\_H}, P_{PowerClass})$. $P_{EMAX\_L}$ and $P_{EMAX\_H}$, respectively, are the maximum allowed power configured by higher layers. $P_{UMAX}$ is the WTRU maximum output power, depending on the WTRU power class and/or PA implementation. $P_{PowerClass}$ is the WTRU maximum output power, depending on the WTRU power class, without taking into account the tolerance or any backoff. $P'_{CMAX}$ is a modification of $P_{CMAX}$ as defined previously, in effect lowering the lower bound of $P_{CMAX}$ given that it is bounded by $P_{UMAX}$ rather than by $P_{EMAX\_L}$. $\Delta CM(i)$ is a factor related to the higher CM (typically in dB) due to loss of the single carrier property in subframe i. $\Delta CM(i)$ is determined by the WTRU by any known method, taking into account the given PA implementation. For a WTRU with more than one PA, the method may be unique for each PA.

Statistic-Based Power Headroom Reporting

With multiple PH values to be reported, the PHR signaling overhead in LTE-A increases compared to that of LTE. To save control signaling, an efficient PHR signaling may be used.

To reduce overhead, a reduced number of PH values may be signaled. The goal of reporting PH is to let the network know how much the power may be set for an UL transmission. It may be difficult to select a particular per-carrier PHR to signal to the network, because the current PHR definition depends on the UL scheduling grant, differences in pathloss, and limitations on different PAs. For example, if the grant in carrier 1 is larger than the grant in carrier 2, the PHR in carrier 1 may be smaller than in carrier 2 even if the pathloss in carrier 1 is smaller.

To reduce overhead, a statistic of the multiple carrier group (or carrier) specific PHRs may be used. For example, the statistic may be any one of: the smallest PH from the set, the PH corresponding to the largest pathloss carrier, or the PH corresponding to the smallest pathloss carrier ($P_{CMAX\_carrier}$–pathloss). By selecting the PHR that corresponds to the smallest pathloss carrier, it effectively removes the grant dependent aspect from the PHR selection.

A statistical measure of the individual PHRs may be used. As an example, the mean of the PHs or the worst-case PH may be reported. In addition to this statistical measure, differential PH values for individual carriers may also be reported.

Differential Reporting

To save control signaling overhead, differential PH reporting may be used. For example, for Method 2.B, one or several carriers' PH values may be reported with full resolution and set as reference points. The PH values for the rest of the carriers may be computed and reported differentially (i.e., as a delta) with respect to reference points. Another example is that in Method 2.D, the wideband PH values may be used as reference points, then carrier group-specific PH values may be computed and reported differentially with respect to the wideband PH value.

The signaling format for a full-resolution PHR (used as reference point) may be kept the same as that for LTE R8, i.e., six bits with the range [40; −23] dB with a resolution of 1 dB, so that backward compatibility may be maintained. Differential PHR may be reported with fewer bits.

Mapping of Power Headroom Reporting in the Uplink

In LTE, the PH is carried in a medium access control (MAC) control element (CE) on the PUS CH on the UL carrier (since it has only one carrier). For LTE-A, there may be several PH values to be reported. Therefore, the mapping of the PHR to the UL carrier(s) has to be specified.

When only one type of PHR is triggered in a given subframe or transmission time interval (TTI), any one of the following PHR to UL carrier mappings may be used.

1. Carrier-specific PHR (for a carrier with an UL grant) is transmitted on its own UL carrier.

2. Carrier-specific PHR (for a carrier without an UL grant) is transmitted on a predefined UL carrier.

3. Carrier group-specific PHR (for a carrier group with an UL grant) is transmitted on a carrier within the carrier group.

4. Carrier group-specific PHR (for a carrier group with an UL grant) is transmitted on a carrier according to a predetermined rule.

5. Wideband PHR is mapped on one carrier according to a predefined rule.

When more than one type of PHR is triggered in a given sub-frame or TTI, the PHR for the carrier (or carriers/carrier group) without an UL grant may be transmitted on the same carrier as a PHR for a carrier (or carriers/carrier group) with an UL grant. Wideband PHR with an UL grant may be transmitted on the same carrier as the carrier-specific or carrier group-specific PHR with grant or vice versa.

Reporting Modes of Power Headroom

There are several types of PH information. Wideband PH (WB-PHR) includes one WB-PHR for all carriers with a valid UL scheduling grant in the current TTI (Type 1) or one WB-PHR for all carriers without a valid UL scheduling grant in the current TTI (Type 2). Carrier-specific or carrier group-specific PH(CS-PHR) includes one CS-PHR for each carrier or carrier group with a valid UL scheduling grant in the current TTI (Type 3) or one CS-PHR for each carrier or carrier group without a valid UL scheduling grant in the current TTI (Type 4).

The system may support several PH reporting modes, which may be configured and reconfigured by the eNodeB via RRC signaling or L1/L2 signaling. The PH reporting for LTE-A with carrier aggregation may be any one or a combination of aforementioned types. For example, the following reporting modes are possible depending on the UL multiple access scheme, the UL power control scheme, and whether the maximum WTRU transmit power limit is per carrier or across all carriers:

Report mode 1: Type 1 PH only
Report mode 2: Type 3 PH only
Report mode 3: Types 1 and 3 PH
Report mode 4: Types 1 and 2 PH
Report mode 5: Types 3 and 4 PH
Report mode 6: Types 1, 2, and 3 PH
Report mode 7: Types 1, 3, and 4 PH
Report mode 8: Types 1, 2, 3, and 4 PH Configuration of Power Headroom Reporting Procedures Reporting parameters (PERIODIC PHR TIMER, DL_PathlossChange, and PROHIBIT_PHR_TIMER) used for different types of PH may be configured to control the reporting frequency for each type of PH. For PH Type i (where i=1, 2, 3, or 4), the parameters PROHIBIT_PHR_TIMER(i), PERIODIC PHR TIMER(i), and DL_PathlossChange(i) may be used.

The following are examples of reporting parameter configurations.

Type 2 PH and Type 4 PH may be reported less frequently than Type 1 PH and Type 3 PH. Some or all of the reporting parameters (PROHIBIT_PHR_TIMER(i), PERIODIC PHR TIMER(i), and DL_PathlossChange(i)) for Type 2 and Type 4 are larger than those for Type 1 and Type 3. A larger PROHIBIT_PHR_TIMER(i) value means that the time between an event-triggered PHR (i.e., triggered by change of pathloss) and the last PHR may be larger. A larger PERIODIC PHR TIMER(i) value means that the time between two periodic PHRs may be larger. A larger DL_PathlossChange(i) value means that the change of the DL pathloss may be larger to trigger a (non-periodic) PHR.

Type 1 PH may be reported more frequently than Type 3 PH in cases where the maximum WTRU transmit power limit is the sum of WTRU transmit power across all carriers. In this case, some or all of the parameters (PROHIBIT_PHR_TIMER(i), PERIODIC PHR TIMER(i), and DL_PathlossChange (i)) for Type 3 PH are larger than those for Type 1 PH.

Type 3 PH may be reported more frequently than Type 1 PH in cases where the maximum WTRU transmit power limit is per carrier (or carrier group) instead of across all carriers. In this case, some or all of the parameters (PROHIBIT_PHR_TIMER(i), PERIODIC PHR TIMER(i), and DL_PathlossChange(i)) for Type 1 PH are larger than those for Type 3 PH.

In regard to the periodicity of the different PHR types, the eNodeB may define each PHR type and may set the reporting periodicity of each type as needed. The frequency and the type of reporting relates to functionality of the eNodeB's scheduler.

For PH defined over several carriers (for example, the wideband PH or carrier group-specific PH), a pathloss metric called equivalent pathloss, $PL_{eq}$, may be used for PH reporting. The equivalent pathloss may be any one of following: the maximum (or minimum) pathloss among carriers of interest, the average pathloss of carriers of interest, or the weighted average of pathloss among carriers of interest.

Pathloss of each carrier may be weighted by its contribution to the total WTRU calculated transmit power (among all carriers or a group of carriers). The pathloss may be weighted by the following factors: the bandwidth of the PUSCH resource assignment on each carrier expressed in the number of resource blocks valid for subframe i, a transport format factor, and a transmit power adjustment step (according to an UL power control command) for subframe i. The transport format factor is determined by: $\Delta_{TF}(i)=10\ \log_{10}$ $(2^{MPR(i) \times K_S} - 1)$ for $K_S = 1.25$ and $\Delta_{TF}(i) = 0$ for $K_S = 0$ where $K_S$ is a cell specific parameter given by RRC.

$$MPR(i) = \frac{TBS(i)}{N_{RE}(i)}$$

where TBS(i) is the transport block size for subframe i and $N_{RE}(i)$ is the number of resource elements.

Wideband Power Headroom Reporting Procedures

For the case of wideband PH reporting, one PROHIBIT_PHR_TIMER(i) and one PERIODIC PHR TIMER(i) may be maintained (e.g., start, running, expiration, restart) for WB-PHR type for the entire cell bandwidth.

A PHR of Type i may be triggered if any of the following events occur.

1. The PROHIBIT_PHR_TIMER(i) expires or has expired and the pathloss has changed more than DL_PathlossChange (i) dB since the last PHR. For wideband PHR, the pathloss used for PHR triggering is the $PL_{eq}$ defined above.

2. The PERIODIC PHR TIMER(i) expires, in which case the PHR is referred to as a "Periodic PHR."

3. Upon configuration and reconfiguration (or reset) of a Periodic PHR.

Figure 2:
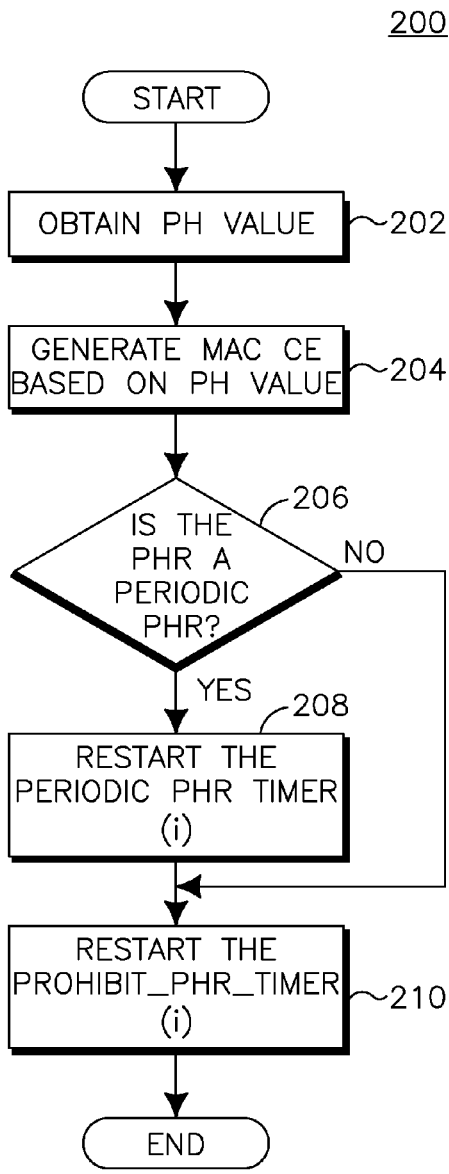
FIG. 2 is a flowchart of a method for wideband PH reporting.

If the PH reporting procedure determines that a PHR of Type i has been triggered since the last transmission of a PHR of the same type and if the WTRU has UL resources allocated for new transmission for this TTI, then the method 200 as shown in FIG. 2 may be performed.

The PH value is obtained from the physical layer (step 202). The Multiplexing and Assembly procedure in the MAC is instructed to generate a PHR MAC CE based on the obtained PH value (step 204). A determination is made whether the PHR is a Periodic PHR (step 206). If the PHR is a Periodic PHR, then restart the PERIODIC PHR TIMER(i) (step 208). If the PHR is not a Periodic PHR (step 206) or after restarting the PERIODIC PHR TIMER(i) (step 208), restart the PROHIBIT_PHR_TIMER(i) (step 210). The method then terminates.

Even if multiple events for one type WB-PHR occur by the time a PHR may be transmitted, one PHR per type is included in the MAC PDU.

Carrier-Specific or Carrier Group-Specific Power Headroom Reporting Procedures

In another example, for the case of carrier-specific and carrier group-specific PH reporting, one PROHIBIT_PHR_TIMER and one PERIODIC PHR TIMER are maintained for each CS-PHR Type for each carrier or carrier group. Within the same type, the PH reporting procedure of one carrier or carrier group is independent of other carriers or carrier groups.

A PHR of Type i of each carrier or carrier group may be triggered if any of the following events occur.

1. The PROHIBIT_PHR_TIMER(i) of this carrier or carrier group expires or has expired and the pathloss has changed more than DL_PathlossChange(i) dB since the last PHR of Type i of this carrier or carrier group. For carrier-specific PH, the pathloss follows the same definition as in LTE. For carrier group-specific PH, the pathloss is the $PL_{eq}$ defined above.

2. The PERIODIC PHR TIMER(i) of this carrier or carrier group expires, in which case the PHR is referred to as "Periodic PHR."

3. Upon configuration and reconfiguration (or reset) of a Periodic PHR.

Figure 3:
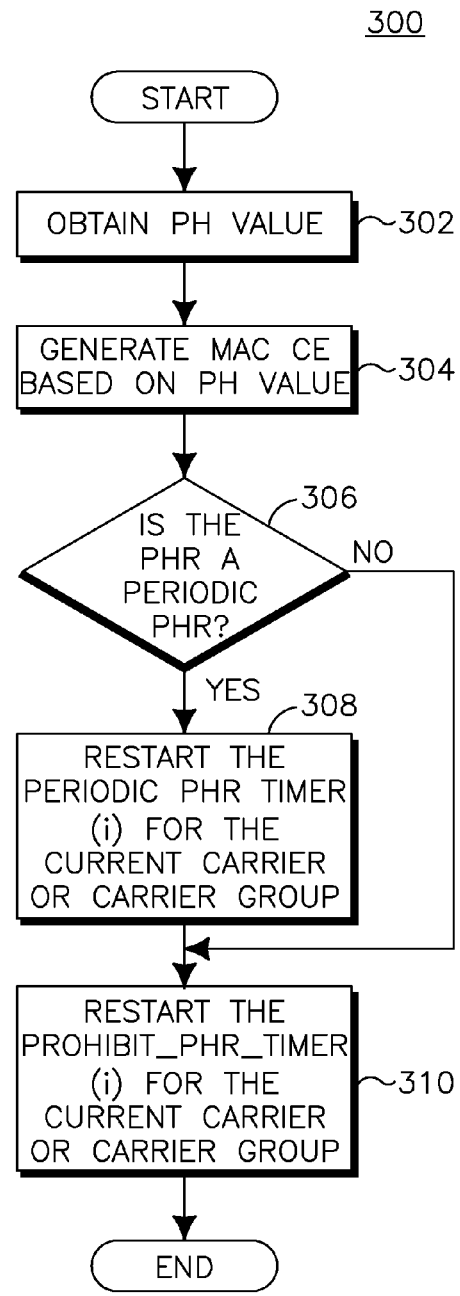
FIG. 3 is a flowchart of a method for carrier-specific or carrier group-specific PH reporting.

If the PH reporting procedure determines that a PHR of Type i for this carrier or carrier group has been triggered since the last transmission of a PHR of the same type and if the WTRU has UL resources allocated for new transmission for this TTI, then the method 300 as shown in FIG. 3 is performed.

The PH value is obtained from the physical layer (step 302). The Multiplexing and Assembly procedure in the MAC is instructed to generate a PHR MAC CE based on the obtained PH value (step 304). A determination is made whether the PHR is a Periodic PHR (step 306). If the PHR is a Periodic PHR, then restart the PERIODIC PHR TIMER(i) for this carrier or carrier group (step 308). If the PHR is not a Periodic PHR (step 306) or after restarting the PERIODIC PHR TIMER(i) (step 308), restart the PROHIBIT_PHR_TIMER(i) for this carrier or carrier group (step 310). The method then terminates.

Even if multiple events for one type PHR for one carrier or carrier group occur by the time a PHR may be transmitted, only one PHR per type per carrier or carrier group may be included in the MAC PDU. But multiple PHRs of the same type or different types may be included in the MAC PDU (the header of MAC PDU implies MAC CE, then one MAC CE may also concatenate multiple control commands, e.g., multiple PHRs).

The PHR may alternatively be triggered by the WTRU sending a buffer status report (BSR) and if the Periodic PHR is not currently running. Only one BSR value is reported for the WTRU, regardless of the number of UL carriers. In one instance, a BSR may be sent when the WTRU has a UL grant and the BSR informs the eNodeB of the buffer status. If the number of padding bits on the PUSCH is equal to or larger than the size of the one configured PHR type plus its subheader, at least one PHR type is reported on the PUSCH along with the BSR, instead of sending the padding bits. Sending the PHR along with the BSR provides the eNodeB with a more complete picture of the current status at the WTRU, so that the eNodeB scheduler may take more appropriate action. Also when the BSR is empty, the WTRU may transmit one or several PHRs (wideband type, carrier-specific type, or carrier group-specific type) in place of the BSR, instead of sending an empty BSR on the PUSCH. The PHR may be set to the report mode according to the requested resource in the BSR and the PH reported is the momentary PH value calculated for the report.

Exemplary LTE System Configuration

Figure 4:
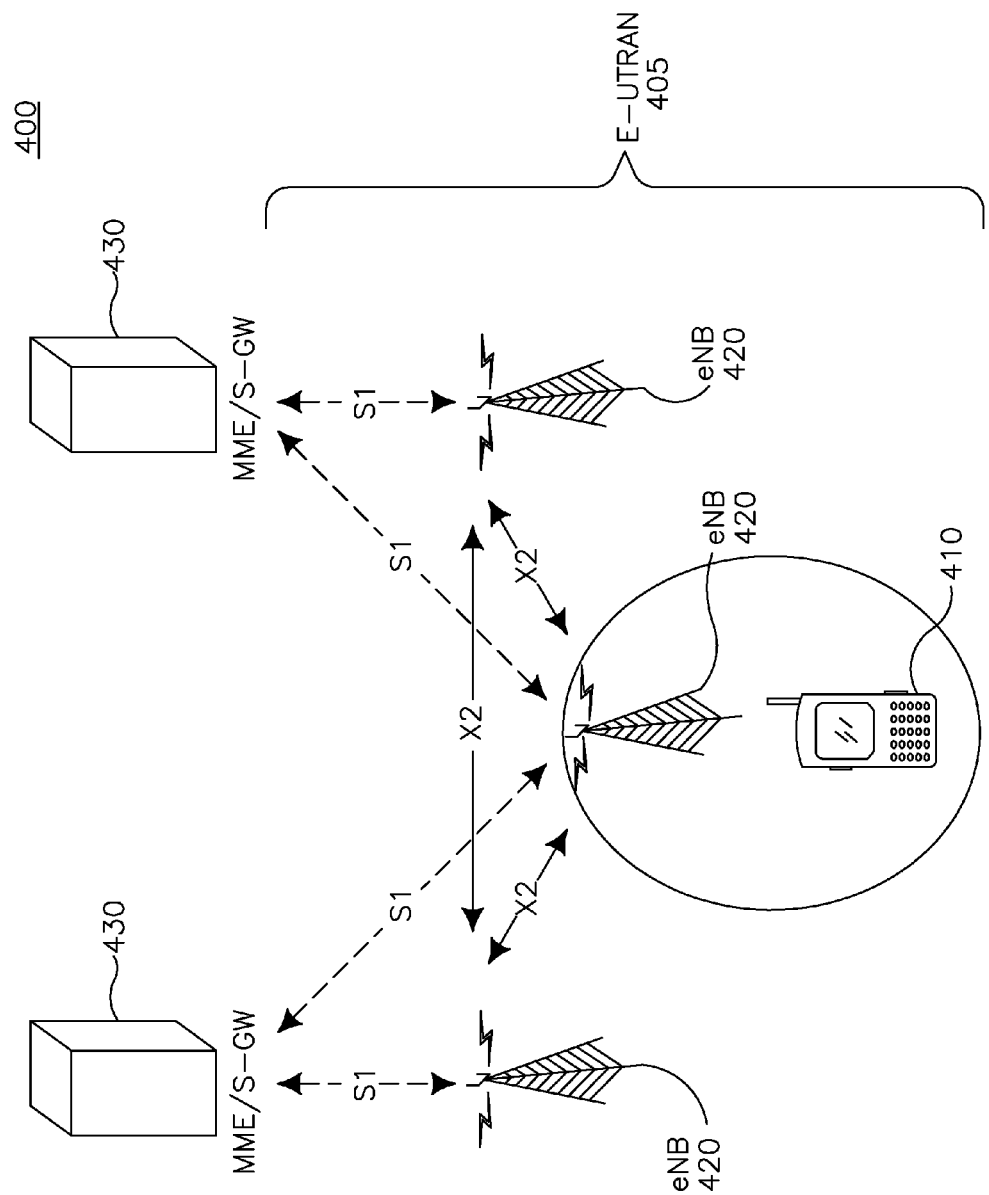
FIG. 4 shows an LTE wireless communication system/access network.

FIG. 4 shows a Long Term Evolution (LTE) wireless communication system/access network 400 that includes an Evolved-Universal Terrestrial Radio Access Network (E-UTRAN) 405. The E-UTRAN 405 includes a WTRU 410 and several evolved Node-Bs, (eNBs) 420. The WTRU 410 is in communication with an eNB 420. The eNBs 420 interface with each other using an X2 interface. Each of the eNBs 420 interface with a Mobility Management Entity (MME)/Serving GateWay (S-GW) 430 through an S1 interface. Although a single WTRU 410 and three eNBs 420 are shown in FIG. 4, it should be apparent that any combination of wireless and wired devices may be included in the wireless communication system access network 400.

Figure 5:
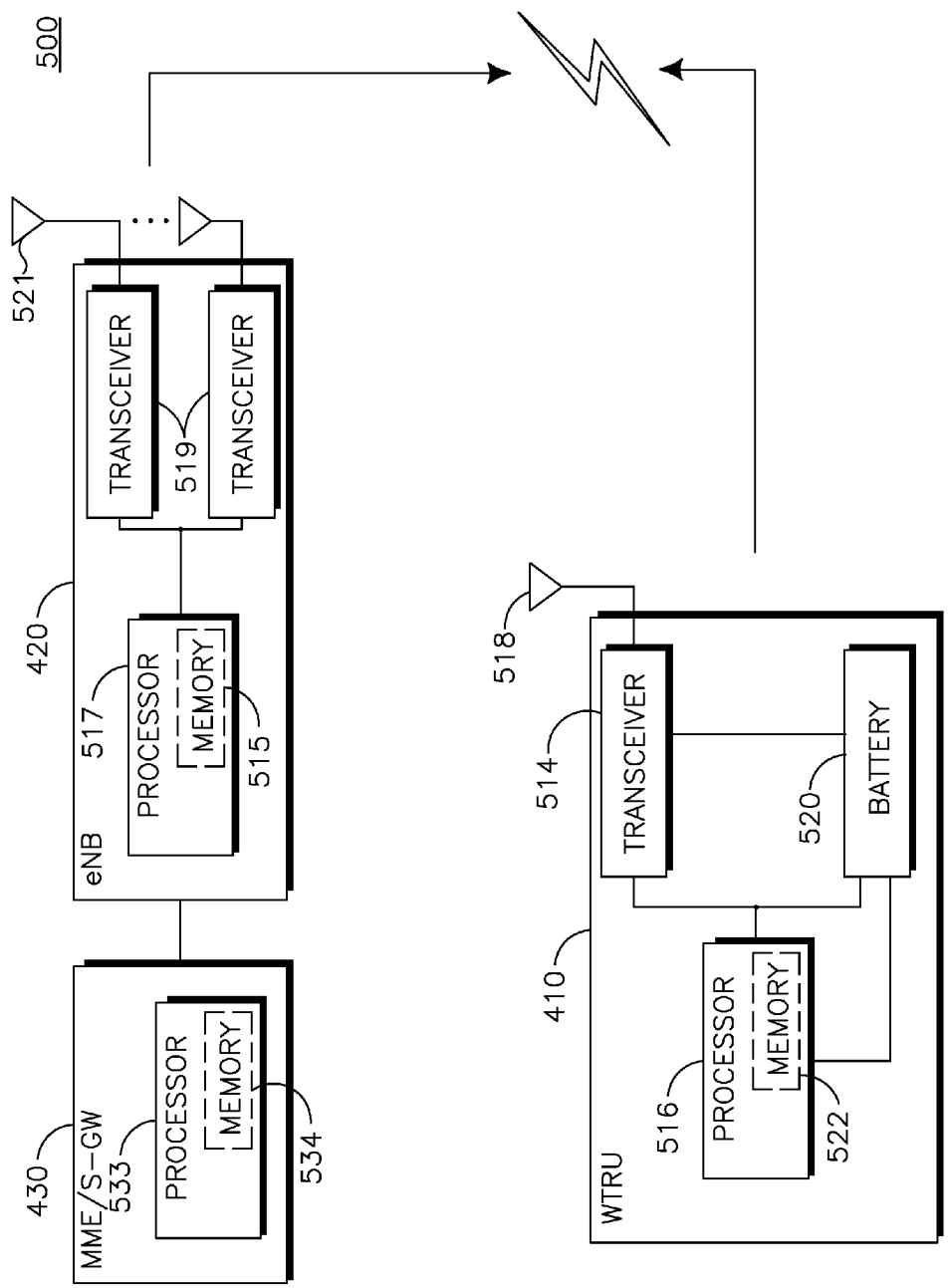
FIG. 5 is an exemplary block diagram of the LTE wireless communication system of FIG. 4.

FIG. 5 is an exemplary block diagram of an LTE wireless communication system 500 including the WTRU 410, the eNB 420, and the MME/S-GW 430. As shown in FIG. 5, the WTRU 410, the eNB 420 and the MME/S-GW 430 are configured to perform a method of uplink power headroom reporting for carrier aggregation In addition to the components that may be found in a typical WTRU, the WTRU 410 includes a processor 516 with an optional linked memory 522, at least one transceiver 514, an optional battery 520, and an antenna 518. The processor 516 is configured to perform a method of uplink power headroom reporting for carrier aggregation. The transceiver 514 is in communication with the processor 516 and the antenna 518 to facilitate the transmission and reception of wireless communications. In case a battery 520 is used in the WTRU 410, it powers the transceiver 514 and the processor 516.

In addition to the components that may be found in a typical eNB, the eNB 420 includes a processor 517 with an optional linked memory 515, transceivers 519, and antennas 521. The processor 517 is configured to perform a method of uplink power headroom reporting for carrier aggregation. The transceivers 519 are in communication with the processor 517 and antennas 521 to facilitate the transmission and reception of wireless communications. The eNB 420 is connected to the Mobility Management Entity/Serving GateWay (MME/S-GW) 430 which includes a processor 533 with an optional linked memory 534.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

The invention claimed is:

1. A method for reporting a carrier-specific power headroom for aggregated carriers, the method comprising:
   determining a first carrier from a plurality of aggregated carriers that has a physical uplink shared channel (PUSCH) transmission in a subframe i;
   determining a second carrier from the plurality of aggregated carriers that does not have a PUSCH transmission in a subframe i;
   calculating a first power headroom according to the formula:

$$PH(k_1,i) = P_{CMAX_{carrier}}(k_1) - P_{PUSCH\_UG}(k_1,i)$$

where $k_1$ is the first carrier, and $P_{PUSCH\_UG}(k_1,i)$ is a transmit power for the first carrier in subframe i prior to imposing maximum power limitations; and
   calculating a second power headroom for the second carrier according to the formula:

$$PH(k_2,i) = P_{CMAX\_carrier}(k_2) - P_{PUSCH\_REF}(k_2,i)$$

where $k_2$ is the second carrier, and $P_{PUSCH\_REF}(k_2,i)$ is a transmit power determined according to a reference grant allocation.

2. The method according to claim 1, wherein:

$$P_{CMAX\_carrier}(k) 10\log_{10}\left(\left(\frac{BW_k}{\sum_{k=1,K,K} BW_k}\right) \times 10^{\frac{P_{CMAX}}{10}}\right)$$

where $BW_k$ is the bandwidth for carrier k, K is a maximum number of carriers, $P_{CMAX}$ is a total maximum transmit power, and the formula is used for all sub-bands or carriers across all power amplifiers at a wireless transmit/receive unit.

3. The method according to claim 2, wherein the sum of $P_{CMAX\_carrier}(k)$ for all carriers k is limited by $P_{CMAX}$ such that $$\sum_{k=1,K,K} P_{CMAX\_carrier}(k) \leq P_{CMAX}.$$

4. The method according to claim 1, wherein:

$$P_{CMAX\_carrier}(k) = 10\log_{10}\left(\left(\frac{BW_k}{\sum_{k\in\Omega} BW_k}\right) \times 10^{\frac{P_{CMAX}}{10}}\right)$$

where $BW_k$ is the bandwidth for carrier k, $\Omega$ is a set of active carriers, $P_{CMAX}$ is a total maximum transmit power, and the formula is used for a subset of carriers that have an active grant in subframe i for all sub-bands or carriers across all power amplifiers at a wireless transmit/receive unit.

5. The method according to claim 4, wherein the sum of $P_{CMAX\_carrier}(k)$ for all carriers k in $\Omega$ is limited by $P_{CMAX}$ such that $$\sum_{k\in\Omega} P_{CMAX\_carrier}(k) \leq P_{CMAX}.$$

6. The method according to claim 1, wherein:

$$P_{CMAX\_carrier}(k) = 10\log_{10}\left(\left(\frac{BW_k}{\sum_{k\in\Omega} BW_k}\right) \times 10^{\frac{P_{CMAX}(m)}{10}}\right)$$

where $BW_k$ is the bandwidth for carrier k, $\Omega_m$ is a set of carriers of carrier group m, and $P_{CMAX}(m)$ is a maximum transmit power for carrier group m.

7. The method according to claim 6, wherein the sum of $P_{CMAX\_carrier}(k)$ for all carriers k in $\Omega_m$ is limited by $P_{CMAx}(m)$ such that $$\sum_{k \in \Omega_m} P_{CMAX\_carrier}(k) \le P_{CMAX}(m).$$

8. The method according to claim 1, wherein:

$$P_{CMAX\_carrier}(k) = 10\log_{10}\left(\left(\frac{BW_k}{\sum_{k \in \Omega_m \cap carrierkhasgrant} BW_k}\right) \times 10^{\frac{P_{CMAX}(m)}{10}}\right)$$

where $BW_k$ is the bandwidth for carrier k, $\Omega_m$ is a set of carriers of carrier group m, and $P_{CMAX}(m)$ is a maximum transmit power for carrier group m.

9. The method according to claim 8, wherein the sum of $P_{CMAX\_carrier}(k)$ for all carriers k in $\Omega_m$ is limited by $P_{CMAX}(m)$ such that $$\sum_{k \in \Omega_m \cap carrierkhasgrant} P_{CMAX\_carrier}(k) \le P_{CMAX}(m).$$

10. The method of claim 1, further comprising reporting the first power headroom and the second power headroom.

11. The method of claim 1, wherein $P_{PUSCH\_UG}(k,i)$ is defined for k carrier according to the formula:

$10\log_{10}(M_{PUSCH}(i) + \alpha(j) \times PL + \Delta_{TF}(i) + f(i)$

12. The method of claim 11, wherein $P_{CMAX\_carrier}(k)$ is a maximum WTRU transmit power of the k carrier.

13. The method of claim 1, wherein the sum of $P_{CMAX\_carrier}(k_2)$ and $P_{CMAX\_carrier}(k_1)$ is less than or equal to a $P_{CMAX}$ for the plurality of aggregated carriers.

14. The method of claim 1, further comprising determining a third carrier that does not have a PUSCH transmission in a subframe i.

15. The method of claim 14, further comprising calculating a third power headroom for the third carrier according to the formula:

$PH(k_3, i) = P_{CMAX\_carrier}(k_3, i)$ where $k_3$ is the third carrier, and $P_{PUSCH\_REF}(k_3, i)$ is a transmit power determined according to a reference grant allocation.

16. The method of claim 15, further comprising reporting the first power headroom, the second power headroom, and the third power headroom.

17. A method for reporting a carrier-specific power headroom, comprising:
calculating a maximum power per carrier, $P_{CMAX\_carrier}$;
on a condition that the carrier does not have a valid uplink grant, calculating a power headroom using a reference grant according to the formula:

$PH(k,i) = P_{CMAX\_carrier}(k) - P_{PUSCH\_REF}(k,i)$ where k is a carrier number, i is a subframe for which the power headroom is to be reported, and $P_{PUSCH\_REF}(k,i)$ is defined as $P_{PUSCH\_REF}(k,i) = f_{1\_REF}(P_{PUSCH\_REF}(n,i)) + \alpha \times (PL(k) - f_{2\_REF}(PL(n)))$ where $f_{1\_REF}(*)$ is a function of a reference carrier-specific wireless transmit/receive unit transmit power, $n \ne k$ and carrier n belongs to the set of carriers with a valid uplink grant, $\alpha$ is a cell-specific parameter, $PL(k)$ is a pathloss estimate on carrier k, and $f_{2\_REF}(*)$ is a function of a reference carrier-specific pathloss; and reporting the calculated power headroom.

18. The method according to claim 17, wherein calculating the maximum power per carrier is based on the formula:

$$P_{CMAX\_carrier}(k) = 10\log_{10}\left(\left(\frac{BW_k}{\sum_{k=1,K,K} BW_k}\right) \times 10^{\frac{P_{CMAX}}{10}}\right)$$

where $BW_k$ is the bandwidth for carrier k, K is a maximum number of carriers, $P_{CMAX}$ is a total maximum transmit power, and the formula is used for all sub-bands or carriers across all power amplifiers at a wireless transmit/receive unit.

19. The method according to claim 18, wherein the sum of $P_{CMAX\_carrier}(k)$ for all carriers k is limited by $P_{CMAX}$ such that $$\sum_{k=1,K,K} P_{CMAX\_carrier}(k) \le P_{CMAX}.$$

20. The method according to claim 17, wherein calculating the maximum power per carrier is based on the formula:

$$P_{CMAX\_carrier}(k) = 10\log_{10}\left(\left(\frac{BW_k}{\sum_{k \in \Omega} BW_k}\right) \times 10^{\frac{P_{CMAX}}{10}}\right)$$

where $BW_k$ is the bandwidth for carrier k, $\Omega$ is a set of active carriers, $P_{CMAX}$ is a total maximum transmit power, and the formula is used for a subset of carriers that have an active grant in subframe i for all sub-bands or carriers across all power amplifiers at a wireless transmit/receive unit.

21. The method according to claim 20, wherein the sum of $P_{CMAX\_carrier}(k)$ for all carriers k in $\Omega$ is limited by $P_{CMAX}$ such that $$\sum_{k \in \Omega} P_{CMAX\_carrier}(k) \le P_{CMAX}.$$

22. The method according to claim 17, wherein calculating the maximum power per carrier is based on the formula:

$$P_{CMAX\_carrier}(k) = 10\log_{10}\left(\left(\frac{BW_k}{\sum_{k \in \Omega_m} BW_k}\right) \times 10^{\frac{P_{CMAX}(m)}{10}}\right)$$

where $BW_k$ is the bandwidth for carrier k, $\Omega_m$ is a set of carriers of carrier group m, and $P_{CMAX}(m)$ is a maximum transmit power for carrier group m.

23. The method according to claim 22, wherein the sum of $P_{CMAX\_carrier}(k)$ for all carriers k in $\Omega_m$ is limited by $P_{CMAX}(m)$ such that $$\sum_{k\in\Omega_m} P_{CMAX\_carrier}(k) \le P_{CMAX}(m).$$

24. A method for reporting a carrier group-specific power headroom, comprising:
calculating a maximum power per carrier, $P_{CMAX\_carrier}(k)$;
on a condition that at least one carrier in the carrier group has a valid uplink grant, calculating a group power headroom according to the formula:

$$PH(m, i) = 10\log_{10}\left(\sum_{k\in\Omega_m} 10^{\frac{P_{CMAX\_carrier}(k)}{10}}\right) - 10\log_{10}\left(\sum_{k\in\Omega_m} 10^{\frac{P_{PUSCH\_UG}(k,i)}{10}}\right)$$

where m is a carrier group number, i is a subframe number in which at least one carrier in the carrier group has a valid uplink grant, $\Omega_m$ is a set of carriers of carrier group m, and $P_{PUSCH\_UG}(k,i)$ is a transmit power for carrier k in subframe i prior to imposing maximum power limitations; and
reporting the calculated power headroom.

25. The method according to claim 24, wherein calculating the maximum power per carrier is based on the formula:

$$P_{CMAX\_carrier}(k) = 10\log_{10}\left(\left(\frac{BW_k}{\sum_{k=1,K,K} BW_k}\right) \times 10^{\frac{P_{CMAX}}{10}}\right)$$

where $BW_k$ is the bandwidth for carrier k, K is a maximum number of carriers, $P_{CMAX}$ is a total maximum transmit power, and the formula is used for all sub-bands or carriers across all power amplifiers at a wireless transmit/receive unit.

26. The method according to claim 25, wherein the sum of $P_{CMAX\_carrier}(k)$ for all carriers k in $\Omega$ is limited by $P_{CMAX}$ such that $$\sum_{k=1,K,K} P_{CMAX\_carrier}(k) \le P_{CMAX}.$$

27. The method according to claim 24, wherein calculating the maximum power per carrier is based on the formula:

$$P_{CMAX\_carrier}(k) = 10\log_{10}\left(\left(\frac{BW_k}{\sum_{k\in\Omega} BW_k}\right) \times 10^{\frac{P_{CMAX}}{10}}\right)$$

where $BW_k$ is the bandwidth for carrier k, $\Omega$ is a set of active carriers, $P_{CMAX}$ is a total maximum transmit power, and the formula is used for a subset of carriers across all power amplifiers at a wireless transmit/receive unit.

28. The method according to claim 27, wherein the sum of $P_{CMAX\_carrier}(k)$ for all carriers k in $\Omega$ is limited by $P_{CMAX}$ such that $$\sum_{k\in\Omega} P_{CMAX\_carrier}(k) \le P_{CMAX}.$$

29. A method for reporting a carrier group-specific power headroom, comprising:
calculating a maximum power per carrier, $P_{CMAX\_carrier}(k)$;
on a condition that no carrier in the carrier group has a valid uplink grant, calculating a group power headroom using a reference grant according to the formula:

$$PH(m, i) = 10\log_{10}\left(\sum_{k\in\Omega_m} 10^{\frac{P_{CMAX\_carrier}(k)}{10}}\right) - 10\log_{10}\left(\sum_{k\in\Omega_m} 10^{\frac{P_{PUSCH\_REF}(k,i)}{10}}\right)$$

where m is a carrier group number, i is a subframe number for which the power
headroom is to be reported, $\Omega_m$ is a set of carriers of carrier group m, and $P_{PUSCH\_REF}(k,i)$ is defined as $$P_{PUSCH\_REF}(k,i) = f_{1\_REF}(P_{PUSCH\_REF}(n,i) + \alpha \times (PL(k) - f_{2\_REF}(PL(n))))$$

where $f_{1\_REF}(*)$ is a function of a reference carrier-specific WTRU transmit power, $n \ne k$ and carrier n belongs to the set of carriers with a valid uplink grant, $\alpha$ is a cell-specific parameter, $PL(k)$ is a pathloss estimate on carrier k, and $f_{2\_REF}(*)$ is a function of a reference carrier-specific pathloss; and
reporting the calculated power headroom.

30. The method according to claim 29, wherein calculating the maximum power per carrier is based on the formula:

$$P_{CMAX\_carrier}(k) = 10\log_{10}\left(\left(\frac{BW_k}{\sum_{k=1,K,K} BW_k}\right) \times 10^{\frac{P_{CMAX}}{10}}\right)$$

where $BW_k$ is the bandwidth for carrier k, K is a maximum number of carriers, $P_{CMAX}$ is a total maximum transmit power, and the formula is used for all sub-bands or carriers across all power amplifiers at a wireless transmit/receive unit.

31. The method according to claim 30, wherein the sum of $P_{CMAX\_carrier}(k)$ for all carriers k in $\Omega$ is limited by $P_{CMAX}$ such that $$\sum_{k=1,K,K} P_{CMAX\_carrier}(k) \le P_{CMAX}.$$

32. The method according to claim 29, wherein calculating the maximum power per carrier is based on the formula:

$$P_{CMAX\_carrier}(k) = 10\log_{10}\left(\left(\frac{BW_k}{\sum_{k\in\Omega} BW_k}\right) \times 10^{\frac{P_{CMAX}}{10}}\right)$$

33. The method according to claim 32, wherein the sum of $P_{CMAX\_carrier}(k)$ for all carriers k in $\Omega$ is limited by $P_{CMAX}$ such that $$\sum_{\Omega} P_{CMAX\_carrier}(k) \leq P_{CMAX}.$$

34. A method for reporting a carrier group-specific power headroom, comprising:
on a condition that at least one carrier in the carrier group has a valid uplink grant, calculating a group power headroom according to the formula:

$$PH(m, i) = P_{CMAX}(m) - 10\log_{10}\left(\sum_{k=\Omega_m} \frac{P_{PUSCH\_REF}(k, i)}{10}\right)$$

where m is a carrier group number, i is a subframe number in which at least one carrier in the carrier group has a valid uplink grant, $\Omega_m$ is a set of carriers of carrier group m, $P_{CMAX}(m)$ is a configured maximum allowed wireless transmit/receive unit (WTRU) transmit power for carrier group m, and $P_{PUSCH\_UG}(k,i)$ is a transmit power for carrier k in subframe i prior to imposing maximum power limitations; and
reporting the calculated power headroom.

35. A method for reporting a earner group-specific power headroom, comprising:
on a condition that no carrier in the carrier group has a valid uplink grant, calculating a group power headroom using a reference grant according to the formula:

$$PH(m, i) = P_{CMAX}(m) - 10\log_{10}\left(\sum_{k=\Omega_m} \frac{P_{PUSCH\_REF}(k, i)}{10}\right)$$

where m is a carrier group number, i is a subframe number for which the power headroom is to be reported, $\Omega_m$ is a set of carriers of carrier group m, $P_{CMAX}(m)$ is a configured maximum allowed wireless transmit/receive unit (WTRU) transmit power for carrier group m, and $P_{PUSCH\_REF}(k,i)$ is defined as $P_{PUSCH\_REF}(k,i)=f_{1\_REF}(P_{PUSCH\_REF}(n,i))+\alpha \times (PL(k)-f_{2\_REF}(PL(n)))$ where $f_{1\_REF}(*)$ is a function of a reference carrier-specific WTRU transmit power, n≠k and carrier n belongs to the set of carriers with a valid uplink grant, $\alpha$ is a cell-specific parameter, PL(k) is a pathloss estimate on carrier k, and $f_{2\_REF}(*)$ is a function of a reference carrier-specific pathloss; and
reporting the calculated power headroom.

36. A method for reporting carrier-specific power headroom for aggregated carriers, the method comprising:
determining a first maximum power for a first carrier;
determining a first transmit power that corresponds to the first carrier;
calculating a first power headroom for the first carrier;
determining a second maximum power for a second carrier from a plurality of aggregated carriers that does not have a physical uplink shared channel (PUSCH) transmission in a subframe i;
calculating a second power headroom for the second carrier using a reference grant; and
reporting the calculated first and second power headroom.

37. The method according to claim 36, wherein the first carrier has a valid uplink grant, and the first transmit power comprises a transmit power for the first carrier prior to imposing maximum power limitations.

38. The method according to claim 36 wherein the second carrier does not have a valid uplink grant, and a second transmit power comprises a reference transmit power.

39. The method according to claim 38, further comprising:
calculating the reference transmit power based on a pathloss estimate on the second carrier, a pathloss on at least one carrier that has a valid uplink grant, and a transmit power for the at least one carrier that has a valid uplink grant.

40. The method according to claim 38, further comprising:
calculating the reference transmit power using a predetermined value reference.

41. The method according to claim 38, further comprising:
calculating the reference transmit power using at least one parameter of at least one carrier that has a valid uplink grant.

42. The method according to claim 36, wherein the first maximum power for the first carrier is pre-defined by higher layer configurations.

43. The method according to claim 36, wherein calculating the first power headroom comprises determining a difference between the first maximum power and the first transmit power.

44. The method according to claim 36, wherein calculating the second power headroom comprises determining a difference between a second maximum power and the second transmit power.

* * * * *

UNITED STATES PATENT AND TRADEMARK OFFICE
CERTIFICATE OF CORRECTION

PATENT NO. : 8,315,320 B2  
APPLICATION NO. : 12/630562  
DATED : November 20, 2012  
INVENTOR(S) : Guodong Zhang et al.

Page 1 of 2

It is certified that error appears in the above-identified patent and that said Letters Patent is hereby corrected as shown below:

In the Claims

In claim 1, column 20, line 4, " $PH(k_1, i) = P_{CMAXcarrier}(k_1) - P_{PUSCH\_UG}(k_1, i)$ " should read " $PH(k_1, i) = P_{CMAX\_carrier}(k_1) - P_{PUSCH\_UG}(k_1, i)$ ".

In claim 2, column 20, line 19, " $P_{CMAX\_carrier}(k) 10\log_{10}\left(\left(\frac{BW_k}{\Sigma_{k=1,K,K} BW_k}\right) \times 10^{\frac{P_{CMAX}}{10}}\right)$ " should read " $P_{CMAX\_carrier}(k) = 10\log_{10}\left(\left(\frac{BW_k}{\Sigma_{k=1,K,K} BW_k}\right) \times 10^{\frac{P_{CMAX}}{10}}\right)$ ".

In claim 6, column 20, line 63, " $P_{CMAX\_carrier}(k) = 10\log_{10}\left(\left(\frac{BW_k}{\Sigma_{k\in\Omega} BW_k}\right) \times 10^{\frac{P_{CMAX}(m)}{10}}\right)$ " should read " $P_{CMAX\_carrier}(k) = 10\log_{10}\left(\left(\frac{BW_k}{\Sigma_{k\in\Omega_m} BW_k}\right) \times 10^{\frac{P_{CMAX}(m)}{10}}\right)$ ".

In claim 11, column 21, line 34, ")." should be included after "f(i)".

In claim 15, column 21, line 47, " $PH(k_3, i) = P_{CMAX\_carrier}(k_3, i)$ " should read " $PH(k_3, i) = P_{CMAX\_carrier}(k_3) - P_{PUSCH\_REF}(k_3, i)$ ".

In claim 29, column 24, line 41, " $P_{PUSCH_{REF}}(k, i) = f_{1\_REF}(P_{PUSCH\_REF}(n, i) + \alpha \times (PL(k) - f_{2\_REF}(PL(n)))$ ".

Signed and Sealed this  
Twenty-ninth Day of April, 2014

Michelle K. Lee  
*Deputy Director of the United States Patent and Trademark Office*

CERTIFICATE OF CORRECTION (continued)

U.S. Pat. No. 8,315,320 B2 should read "$P_{PUSCH_{REF}}(k,i) = f_{1\_REF}\left(P_{PUSCH\_REF}(n,i)\right) + \alpha \times \left(PL(k) - f_{2\_REF}(PL(n))\right)$".

In claim 32, column 24, line 65, the following, which appears to have been dropped by the USPTO during publication, should follow "$P_{CMAX\_carrier}(k) = 10 \log_{10}\left(\left(\frac{BW_k}{\Sigma_{k \in \Omega} BW_k}\right) \times 10^{\frac{P_{CMAX}}{10}}\right)$":

"where $BW_k$ is the bandwidth for carrier k, $\Omega_m$ is a set of active carriers, $P_{CMAX}$ is a total maximum transmit power, and the formula is used for a subset of carriers that have an active grant in subframe i for all sub-bands or carriers across all power amplifiers at a wireless transmit/receive unit.".

In claim 33, column 25, line 8, "$\Sigma_\Omega P_{CMAX\_carrier}(k) \leq P_{CMAX}$" should read "$\Sigma_{k \in \Omega} P_{CMAX\_carrier}(k) \leq P_{CMAX}$".

In claim 34, column 25, line 18, "$PH(m,i) = P_{CMAX}(m) - 10 \log_{10}\left(\Sigma_{k = \Omega_m} 10^{\frac{P_{PUSCH,REF}(k,i)}{10}}\right)$" should read "$PH(m,i) = P_{CMAX}(m) - 10 \log_{10}\left(\Sigma_{k = \Omega_m} 10^{\frac{P_{PUSCH\_UG}(k,i)}{10}}\right)$".

In claim 35, column 25, line 29, "earner" should read "carrier".